United States Patent
Kuriya

(10) Patent No.: US 8,145,700 B2
(45) Date of Patent: Mar. 27, 2012

(54) CONTENT REPRODUCING APPARATUS AND CONTENT REPRODUCING METHOD

(75) Inventor: Shinobu Kuriya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1388 days.

(21) Appl. No.: 10/944,843

(22) Filed: Sep. 21, 2004

(65) Prior Publication Data

US 2005/0091312 A1 Apr. 28, 2005

(30) Foreign Application Priority Data

Oct. 27, 2003 (JP) .................................. 2003-366374

(51) Int. Cl.
*G06F 15/16* (2006.01)
(52) U.S. Cl. ....................................... 709/203; 709/204
(58) Field of Classification Search .................. 709/203, 709/204; 370/230
See application file for complete search history.

(56) References Cited

U.S. PATENT DOCUMENTS

| 5,956,321 | A | * | 9/1999 | Yao et al. | 370/230 |
| 6,226,618 | B1 | * | 5/2001 | Downs et al. | 705/1 |
| 6,470,449 | B1 | * | 10/2002 | Blandford | 713/178 |
| 6,477,649 | B2 | * | 11/2002 | Kambayashi et al. | 726/27 |

\* cited by examiner

*Primary Examiner* — Adnan Mirza
(74) *Attorney, Agent, or Firm* — Oblon, Spivak, McClelland, Maier & Neustadt, L.L.P.

(57) ABSTRACT

A communication system is disclosed which permits data communication between a server apparatus and a client apparatus over a network. The server apparatus includes a time information managing means which manages time information and which transmits the time information to the client apparatus. The client apparatus includes a time storing means which receives the time information from the server apparatus, which stores the received time information, and which is tamper-proof.

16 Claims, 9 Drawing Sheets

F I G. 5
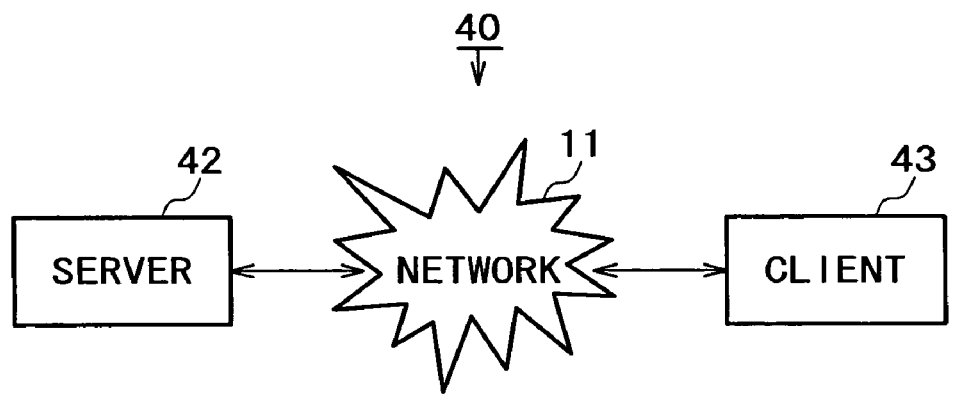

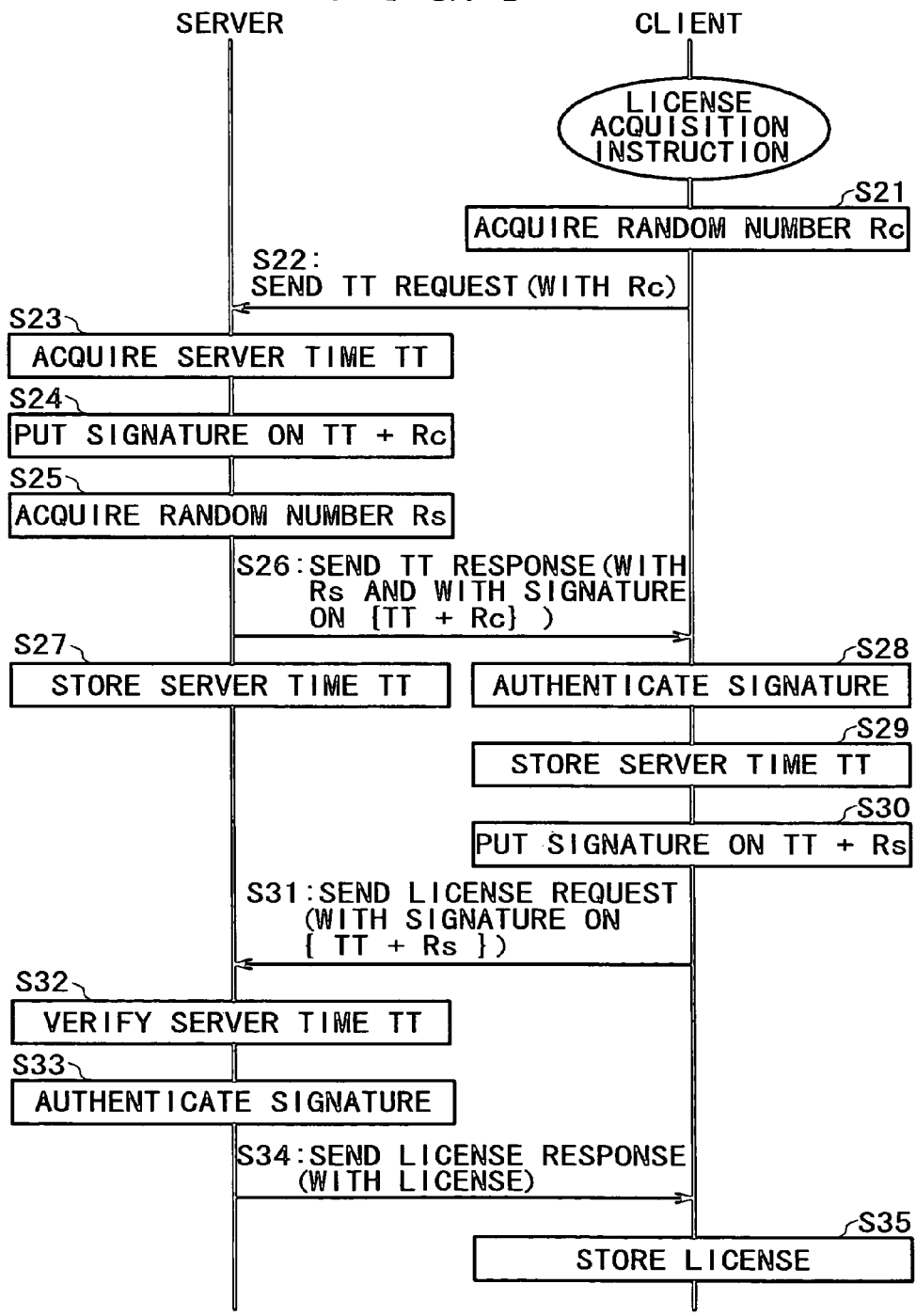

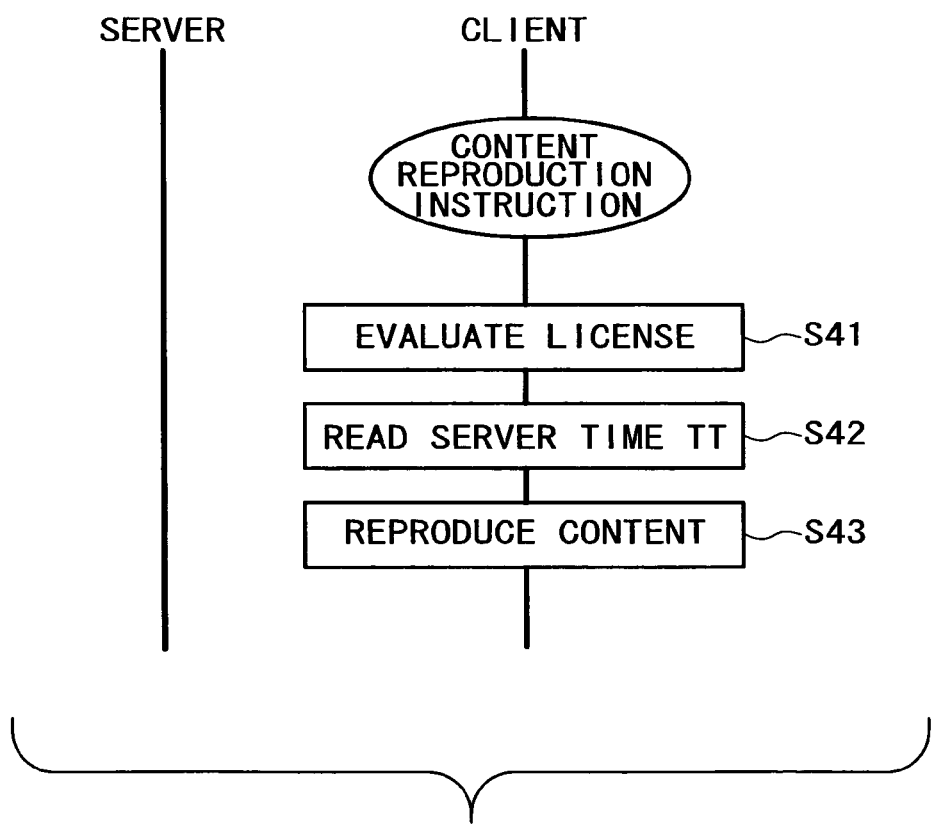

CONTENT REPRODUCING APPARATUS AND CONTENT REPRODUCING METHOD

BACKGROUND OF THE INVENTION

The present invention relates to a communication system, a server apparatus, and a client apparatus for communication data with one another over a network, as well as to a reproducing apparatus and a reproducing method for reproducing content.

The progress of digital equipment in recent years has made it possible for diverse kinds of content such as music and images to be handled as digitized data (i.e., digital content). With the concurrent development of network technology, it has become commonplace to offer, distribute and sell such digital content over a network.

One characteristic of digital content is that in its digital form, the content is easy to copy without incurring deterioration in its quality. This requires making necessary arrangements for preventing illegal copy of the digitized data.

When digital content is to be delivered from a server to a client over the network, measures to prevent illegal copy are implemented illustratively as follows: the server attaches a license to the content of interest before sending it to the client. Upon receipt of the digital content, tamper-resistant modules of the client reproduce the content in keeping with constraints imposed on the content by the license. These measures are designed to prevent illegal reproduction of the content by a malicious user in a secure environment that provides license management over digital content (as discussed illustratively in Japanese Laid-open No. 2002-359616).

There can be a number of ways in which licenses impose restrictions on the digital content they are attached to. For example, a license may enable the corresponding digital content to be reproduced until a specific date and disable it from being reproduced thereafter. Another license may allow the digital content to be reproduced for 30 days following its download and prevent it from getting reproduced thereafter. A yet another license may inhibit the corresponding content from being reproduced until a particular date and enable it to be reproduced thereafter.

In each of these cases, the period of time in which the content of interest can be reproduced is limited. This requires the client to determine the validity of a given license in reference to a certain time base.

However, the time to be referenced is usually the time on the clock incorporated in the client itself. This is a potential security risk. The internal clock can be maliciously readjusted in order to reproduce content illegally beyond the reproduction period authorized by the license for the content.

The present invention has been made in view of the above circumstances and provides an apparatus and a method for preventing illegal reproduction of the content when its reproduction period is restricted by a license.

SUMMARY OF THE INVENTION

In carrying out the invention and according to one aspect thereof, there is provided a communication system for permitting data communication between a server apparatus and a client apparatus over a network; wherein the server apparatus includes a time information managing means which manages time information and which transmits the time information to the client apparatus, and wherein the client apparatus includes a time storing means which receives the time information from the server apparatus, which stores the received time information, and which is tamper-proof.

According to another aspect of the invention, there is provided a server apparatus capable of communicating with apparatuses on a network, the server apparatus including a time information managing means which manages time information and which transmits the time information to a client apparatus communicable over the network.

According to a further aspect of the invention, there is provided a client apparatus for communicating data with a server apparatus over a network, the client apparatus including a time storing means which receives from the server apparatus time information managed by the server apparatus, which stores the received time information, and which is tamper-proof.

According to an even further aspect of the invention, there is provided a reproducing apparatus for reproducing content, including: a time storing means which stores time information and which is tamper-resistant; and a content reproducing means which reproduces stored content and which is tamper-resistant; wherein the time storing means receives the time information from a server apparatus over a network and stores the received time information; and wherein the content reproducing means restricts reproduction of the content in accordance with the restriction information included in the content and on the basis of the time information stored in the time storing means.

According to a still further aspect of the invention, there is provided a reproducing method for reproducing content, including the steps of: causing time information acquired from a server apparatus over a network to be stored into a tamper-resistant storage module; and restricting reproduction of the content in accordance with restriction information included in the content and on the basis of time information stored in the storage module.

Where the inventive communication system, server apparatus, and client apparatus outlined above are in use, the time information managed by the server apparatus is received by the client apparatus over the network and placed into the tamper-resistant module of the client. The system and apparatuses of the invention thus prevent illegal reproduction of content that is subject to restrictions on the time period in which the content can be reproduced.

Where the inventive reproducing apparatus and reproducing method above are in use, the client apparatus is allowed to receive the time information managed by the server apparatus over the network. The received time information is stored into the tamper-resistant module of the client apparatus. When the time period in which to reproduce content is subject to restrictions, the stored time information is referenced for time period control. The reproducing apparatus and method of this invention thus prevent the illegal reproduction of content which could otherwise be committed based on tampered time information.

Other objects, features and advantages of the invention will become more apparent upon a reading of the following description and appended drawings.

BRIEF DESCRIPTION OF THE DRAWINGS

FIG. 5 is a schematic view of a content reproduction system practiced as a second embodiment of this invention;

FIG. 8 is a schematic diagram outlining a typical sequence of steps in which a license is downloaded by the second embodiment; and FIG. 9 is a schematic diagram depicting a typical sequence of steps in which content is reproduced by the second embodiment.

DESCRIPTION OF THE PREFERRED EMBODIMENTS

A first and a second content reproduction system will now be described as preferred embodiments of this invention.

In the description that follows, "content" refers to digitized data constituting pieces of music and images, as well as to data in digital form making up still images, text information such as sentences of novels, game programs, and application programs for use on computers.

Also in the subsequent description, "license" signifies a set of rights to use content, as well as information for managing such rights in detail. Illustratively, the rights to use content include the right to reproduce the content of interest, the right to copy the content from one apparatus to another, a maximum number of times the content is allowed to be reproduced or copied, and a maximum time period during which the content is allowed to be reproduced.

First Embodiment

Figure 1:
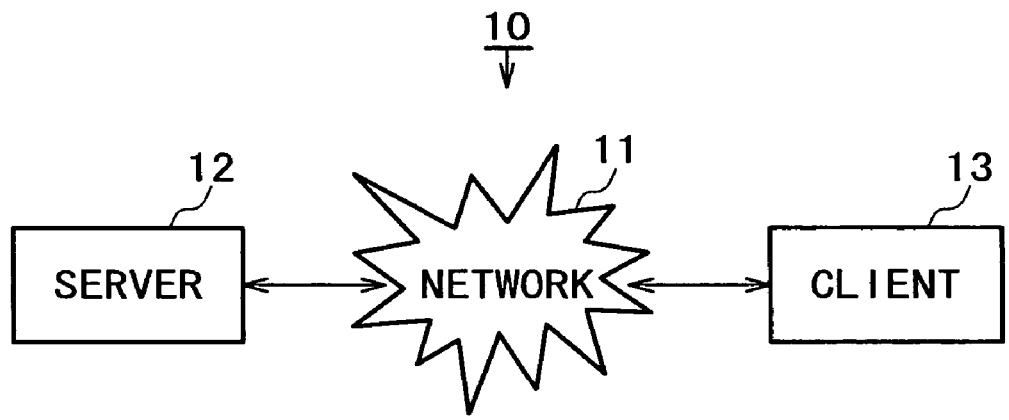
FIG. 1 is a schematic view of a content reproduction system practiced as a first embodiment of this invention.

As shown in FIG. 1, the content reproduction system 10 is made up of a server 12 and a client 13 connected to a network 11. The server 12 and client 13 are each a computer with capabilities of communication over the network 11. That is, the server 12 and client 13 can communicate digital data with each other via the network 11.

Figure 2:
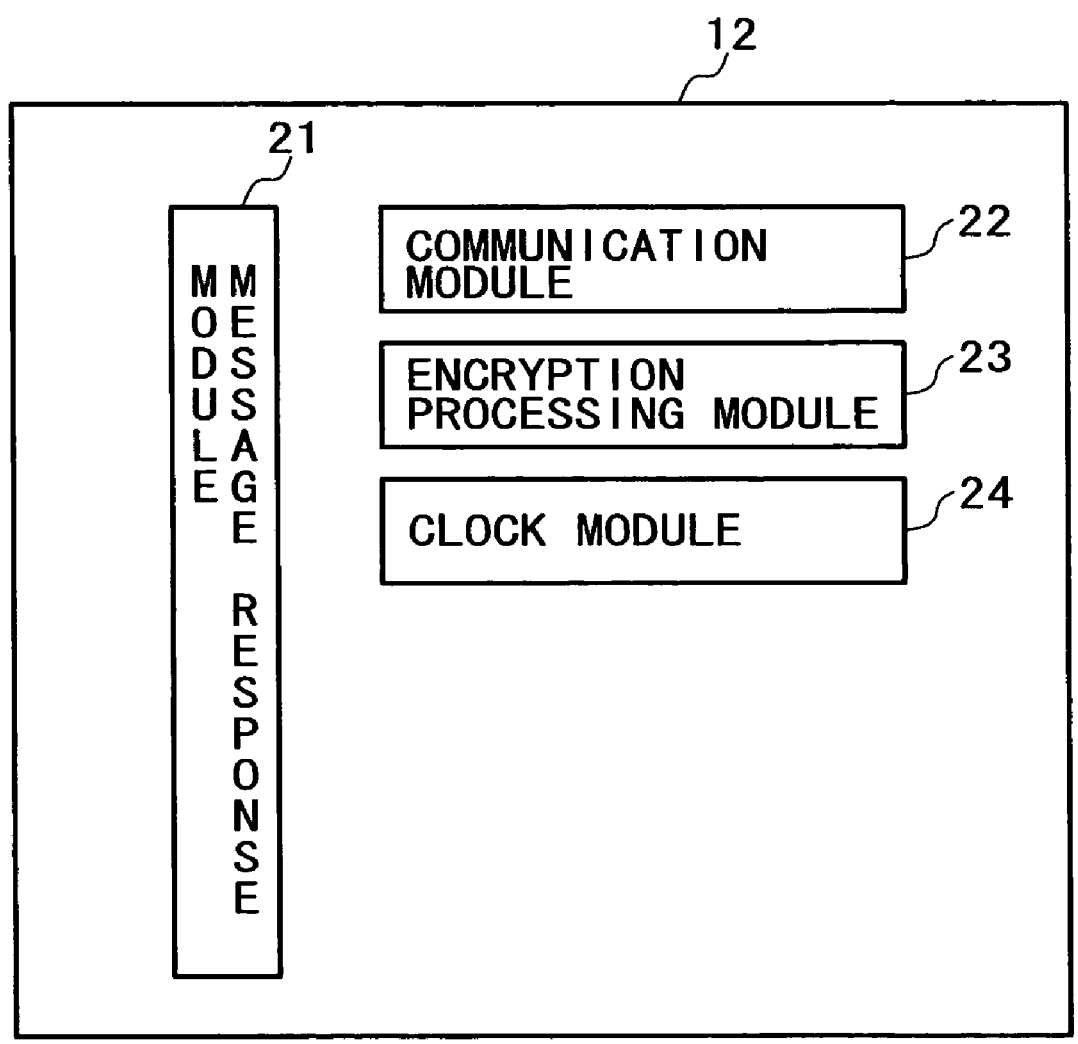
FIG. 2 is a block diagram of a server as part of the first embodiment.

The server 12 includes a message response module 21, a communication module 22, an encryption processing module 23, and a clock module 24, as illustrated in FIG. 2. These modules may be constituted by hardware, by software, or by the combination of both as long as their functions are suitably implemented. In the description that follows, "module" is understood as a hardware module, a software module, or a combination hardware-software module.

The message response module 21 exchanges messages with the client 13 through the communication module 22. Concurrently, the message response module 21 carries out processes corresponding to the messages received from the client 13.

The communication module 22 receives messages from the client 13 over the network 11 and hands the received messages over to the message response module 21. The communication module 22 also transmits messages received from the message response module 21 to the client 13 over the network 11.

The encryption processing module 23 puts a signature on, and conducts verification of, data given by the message response module 21 in response to requests from the latter.

The clock module 24 manages time. In response to a request from the message response module 21, the clock module 24 issues a time value in effect at the time of the request, i.e., the value denoting the current time of day, to the message response module 21. The value issued by the clock module 24 as representative of the current time of day will be called the server time TT hereunder.

Figure 3:
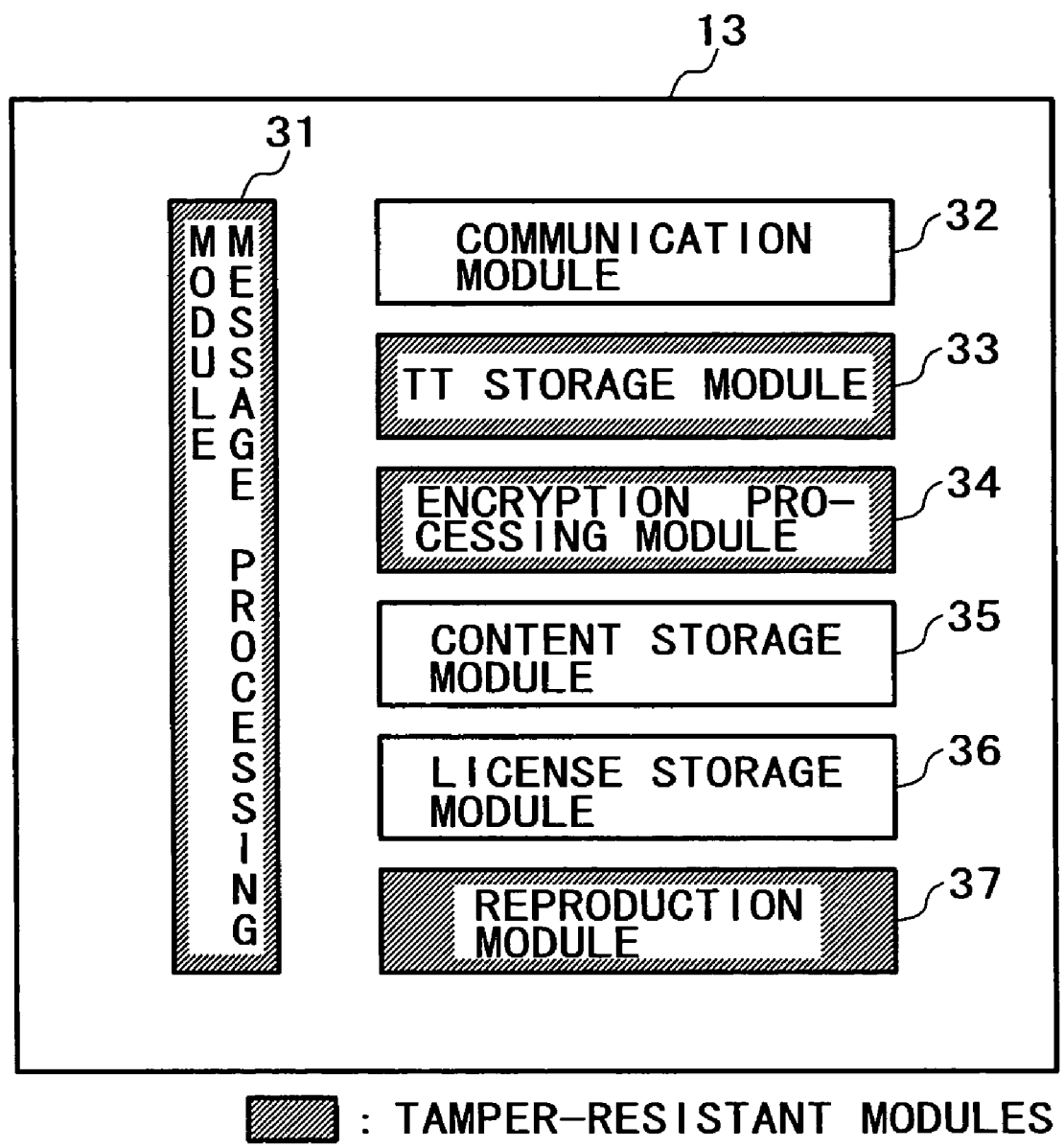
FIG. 3 is a block diagram of a client as part of the first embodiment.

As shown in FIG. 3, the client 13 includes a message processing module 31, a communication module 32, a TT storage module 33, an encryption processing module 34, a content storage module 35, a license storage module 36, and a reproduction module 37.

The message processing module 31 exchanges messages with the server 12 through the communication module 32. Concurrently, the message processing module 31 processes requests for different modules and generates messages to the server 12 according to predetermined sequences.

The communication module 32 receives messages from the server 12 over the network 11 and hands the received messages over to the message processing module 31. The communication module 32 also transmits messages received from the message processing module 31 to the server 12 over the network 11.

The TT storage module 33 stores the server time TT received from the message processing module 31.

The encryption processing module 34 puts a signature on, and conducts verification of, data given by the message processing module 31 in response to requests from the latter.

As its name implies, the content storage module 35 stores content.

The license storage module 36 stores licenses for the content stored in the content storage module 35.

The reproduction module 37 reproduces the content stored in the content storage module 35. At content reproduction time, the reproduction module 37 evaluates the license held in the license storage module 36 and, based on the result of the evaluation, restricts reproduction of the content in question (e.g., reproduction suppressed, bit rate controlled).

The message processing module 31, TT storage module 33, encryption processing module 34, and reproduction module 37 are a tamper-resistant module each. The tamper-resistant module is a module designed to protect its internal structure, its algorithms and the diverse kinds of information held inside against references, changes or modifications by illegally conceived methods or by illegitimately prepared modules.

A hardware-based tamper-resistant module may be designed to have the capabilities to stop outputting its information in response to unauthorized input or application of electricity or forces of diverse kinds, as well as the capabilities to perform mutual authentication with an external module with which to exchange data. A software-based tamper-resistant module may be designed to have its secret information kept dispersed spatially or temporally, have its structure composed of scattered code means, and be installed in a manner that ensures program consistency. For communication with another module, the software-based tamper-resistant module may be arranged to perform mutual authentication with the other module.

The user at the client is thus barred from referencing or modifying the messages issued by the message processing module 31 or the server time TT stored in the TT storage module 33. Furthermore, arrangements are made so as to prevent the user from referencing data exchanges between the tamper-resistant modules.

Figure 4:
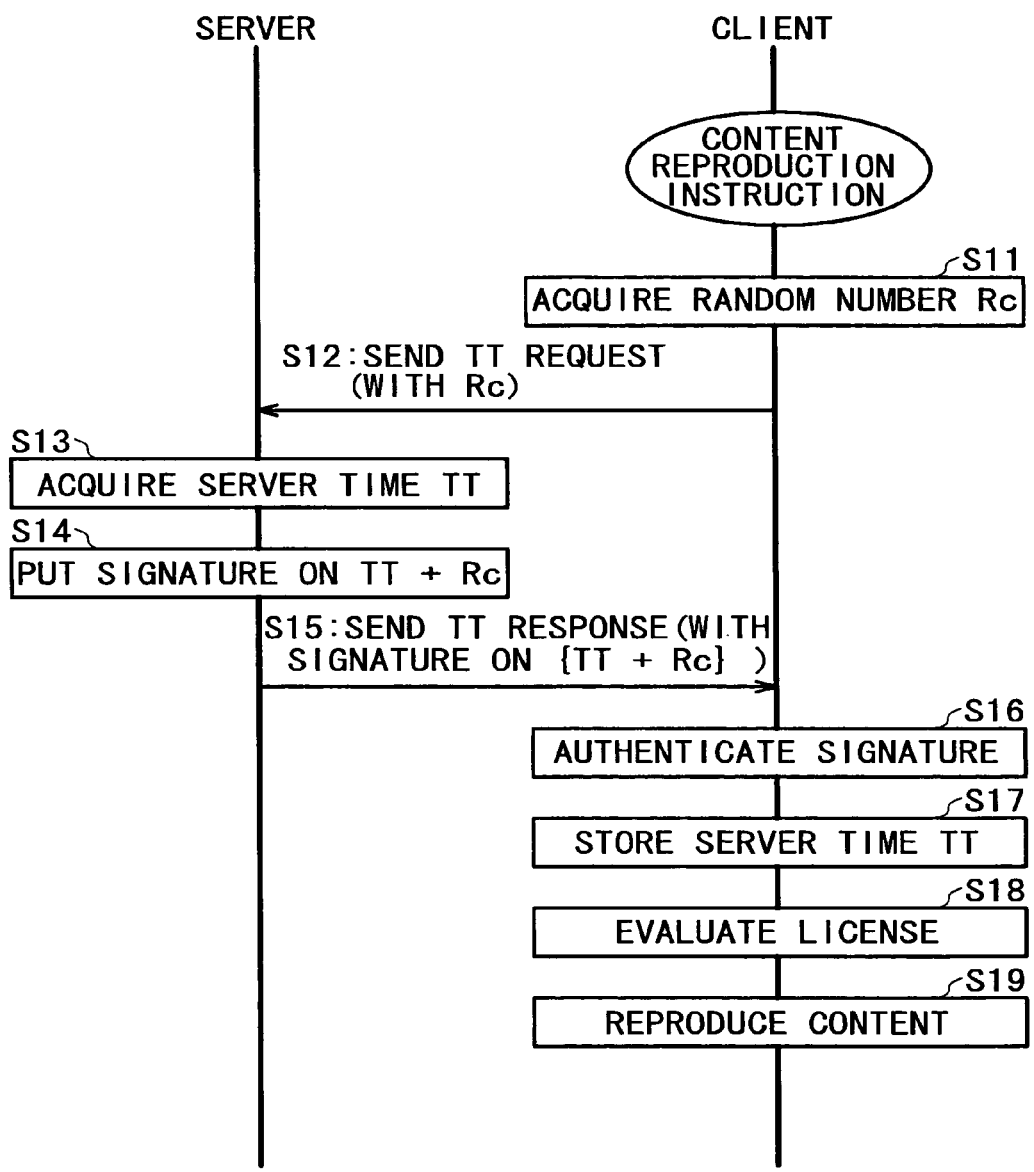
FIG. 4 is a schematic diagram showing a typical sequence of steps in which content is reproduced by the first embodiment.

Described below with reference to FIG. 4 is a typical sequence of steps in which the client 13 reproduces content. It is assumed that the server 12 is operating continuously so that it may be accessed at all times by the client 13 over the network 11.

The client 13 acquires content and its license illustratively from the server 12 (or from other suitable server or media) in advance. In an initial state, the content is stored in the content storage module 35 and the license for the content is held in the license storage module 36.

Given a predetermined content reproduction instruction by the user, the message processing module 31 of the client 13 acquires a random number RC from the encryption processing module 34, and stores the acquired random number inside (step S11).

The message processing module 31 of the client 13 then creates a server time TT request message (called the TT request message hereunder) containing the random number RC. The TT request message is sent by the message processing module 31 to the server 12 through the communication module 32 (step S12).

The transmitted TT request message is received by the communication module 22 of the server 12 over the network 11.

The communication module 22 of the server 12 then hands the TT request message containing the random number RC over to the message response module 21. On receiving the TT request message, the message response module 21 of the server 12 requests issuance of a server time TT from the clock module 24 and acquires the server time TT in effect at that point in time (step S13).

The message response module 21 of the server 12 then turns the random number RC and server time TT into composite information. The composite information made up of the random number RC and server time TT is transferred from the message response module 21 to the encryption processing module 23 so that the latter can put a signature on the composite information (step S14).

The server response module 21 of the server 12 generates a server time TT response message (called the TT response message hereunder) containing the signature-bearing random number RC and server time TT, and sends the TT response message thus generated to the client 13 through the communication module 22 (step S15).

The transmitted TT response message is received by the communication module 32 of the client 13 over the network 11.

The communication module 32 of the client 13 transfers the TT response message containing the signature-bearing random number RC and server time TT to the message processing module 31. Upon receipt of the TT response message, the message processing module 31 of the client 13 transfers to the encryption processing module 34 the original random number RC stored inside as well as the signature-bearing random number RC and server time TT so that the encryption processing module 34 can authenticate the signature (step S16).

If the signature is found to be authentic, the message processing module 31 of the client 13 stores the server time TT contained in the TT response message into the TT storage module 33 (step S17).

The message processing module 31 then issues a content reproduction message to the reproduction module 37. On receiving the content reproduction message, the reproduction module 37 reads the corresponding license from the license storage module 36 and evaluates the retrieved license (step S18). If the license is found to restrict the time period for content reproduction, then the reproduction module 37 reads the server time TT from the TT storage module 33 and recognizes the retrieved server time TT as the current time of day for license evaluation.

If the license under evaluation turns out to permit content reproduction, the reproduction module 37 reads the corresponding content from the content storage module 35 and reproduces the retrieved content. If the license is found partially or totally to suppress reproduction of the content, the reproduction module 37 controls its content reproduction process accordingly (step S19).

As described, when the first content reproduction system 10 reproduces the content whose reproduction period is restricted, the corresponding license is evaluated not on the basis of an internal clock of the client 13 but in reference to the time kept by the server 12 (i.e., server time TT). Thus the first content reproduction system 10 of this invention prevents content that is subject to reproduction period restrictions from being illegitimately reproduced by the client 12 illustratively falsifying its internally kept time data.

Although the first content reproduction system 10 was shown following the sequence in which the server time TT is obtained from the server 12 in response to every content reproduction instruction furnished, this is not limitative of the invention. Alternatively, the license may be referenced immediately after the content reproduction instruction is given. The server time TT may then be acquired from the server 12 only if the referenced license turns out to limit the content reproduction period.

Second Embodiment

The second content reproduction system according to the invention will now be described. In the ensuing description of the second reproduction system, those modules that are functionally the same as those already discussed above as components of the first content reproduction system 10 will be designated by the same reference numerals and their detailed descriptions will be omitted where redundant.

As shown in FIG. 5, the second content reproduction system 40 is constituted by a server 42 and a client 43 connected to the network 11. The server 42 and client 43 are each a computer with capabilities of communication over the network. That is, the server 42 and client 43 can communicate digital data with each other via the network 11.

Figure 6:
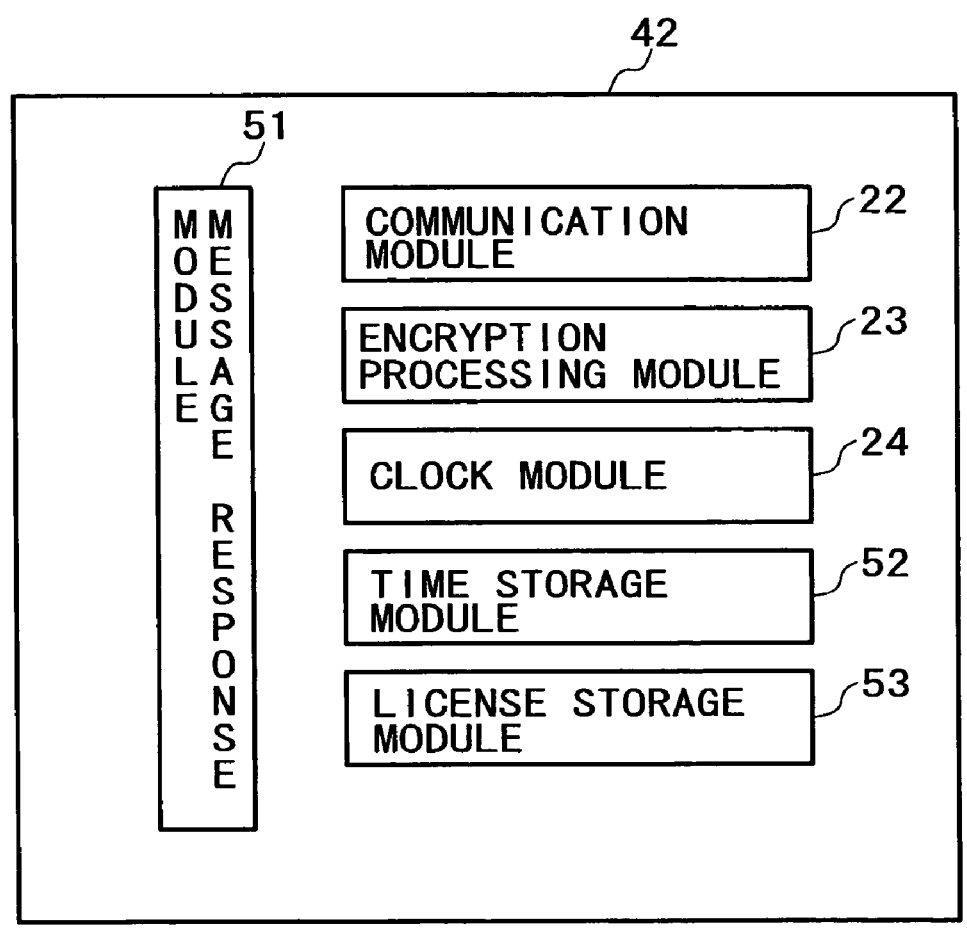
FIG. 6 is a block diagram of a server as part of the second embodiment.

The server 42 includes a message response module 51, a communication module 22, an encryption processing module 23, a clock module 24, a time storage module 52, and a license storage module 53, as illustrated in FIG. 6.

The message response module 51 exchanges messages with the client 43 through the communication module 22. Concurrently, the message response module 51 carries out processes corresponding to the messages received from the client 43.

The time storage module 52 stores the server time TT given by the message response module 51 in response to the request from the latter.

The license storage module 53 stores licenses with regard to the content offered or marketed to users. In response to a request from the message response module 51, the license storage module 53 returns the requested license to the module 51.

Figure 7:
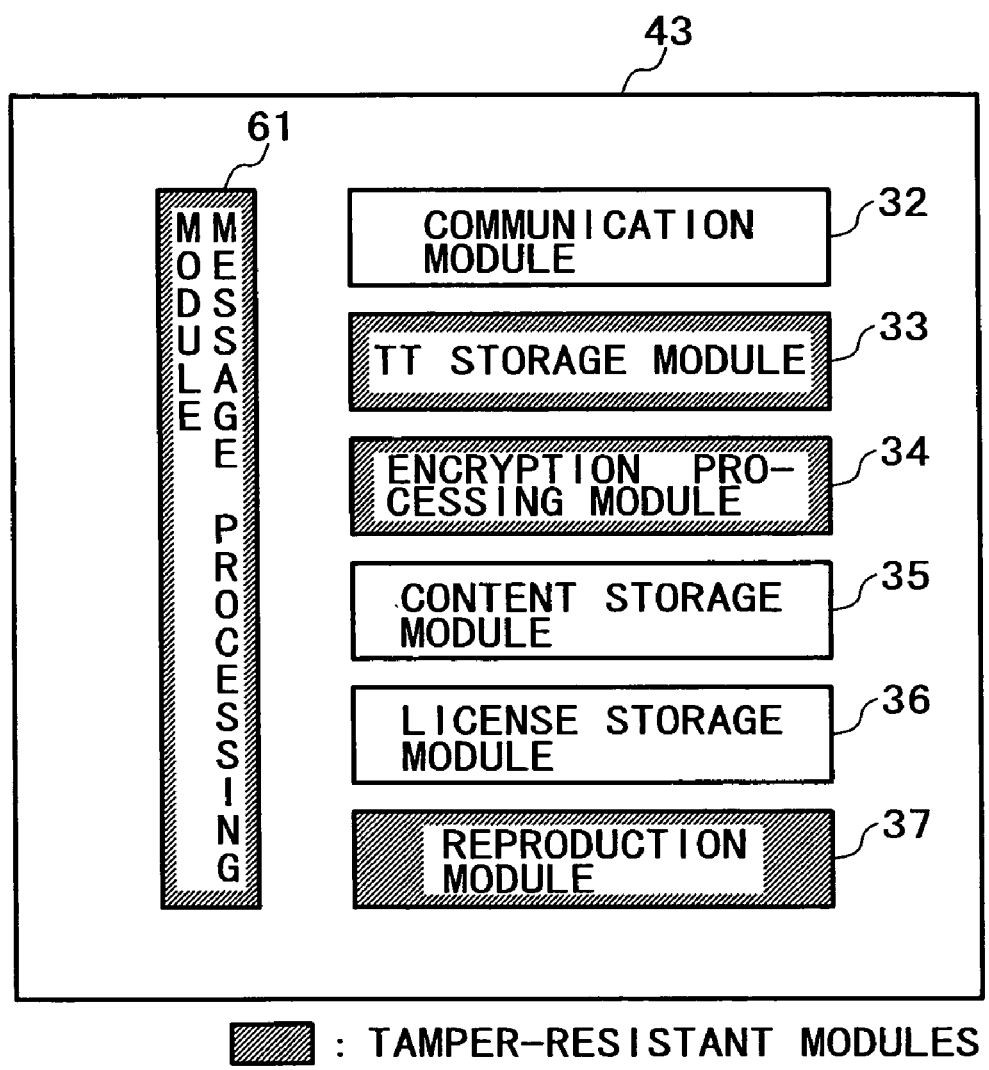
FIG. 7 is a block diagram of a client as part of the second embodiment.

The client 43 includes a message processing module 61, a communication module 32, a TT storage module 33, an encryption processing module 34, a content storage module 35, a license storage module 36, and a reproduction module 37, as depicted in FIG. 7.

The message processing module 61 exchanges messages with the server 42 through the communication module 32. Concurrently, the message processing module 61 processes requests for different modules and generates messages to the server 42 according to predetermined sequences.

The message processing module 61, TT storage module 33, encryption processing module 34, and reproduction module 37 are a tamper-resistant module each.

The user at the client is thus barred from referencing or modifying the messages issued by the message processing module 61 or the server time TT stored in the TT storage module 33. Furthermore, arrangements are made so as to prevent the user from referencing data exchanges between the tamper-resistant modules.

Described below with reference to FIG. 8 is a typical sequence of steps in which the client 43 acquires a license from the server 42. It is assumed that the server 42 is operating continuously so that it may be accessed at all times by the client 43 over the network 11.

The client 43 acquires content illustratively from the server 42 (or from other suitable server or media) in advance. In an initial state, the content is stored in the content storage module 35. A license associated with the content has yet to be acquired. When the user issues a license purchase instruction, the steps described below are carried out.

Given the license purchase instruction from the user, the message processing module 61 of the client 43 acquires a random number RC from the encryption processing module 34, and stores the acquired random number inside (step S21).

The message processing module 61 of the client 43 then generates a server time TT request message (called the TT request message hereunder) containing the random number RC. The TT request message is sent by the message processing module 61 to the server 42 through the communication module 32 (step S22).

The transmitted TT request message is received by the communication module 22 of the server 42 over the network 11.

The communication module 22 of the server 42 then hands the TT request message containing the random number RC over to the message response module 51. On receiving the TT request message, the message response module 51 of the server 42 requests issuance of a server time TT from the clock module 24 and acquires the server time TT in effect at that point in time (step S23).

The message response module 51 of the server 42 then turns the random number RC and server time TT into composite information. The composite information made up of the random number RC and server time TT is transferred from the message response module 51 to the encryption processing module 23 so that the latter can put a signature on the composite information (step S24).

The message response module 51 of the server 42 acquires a random number RS from the encryption processing module 23, and stores the acquired random number RS inside (step S25).

The server response module 51 of the server 42 generates a server time TT response message (called the TT response message hereunder) containing the signature-bearing random number RC and server time TT as well as the random number RS, and sends the TT response message thus generated to the client 43 through the communication module 22 (step S26).

The message response module 51 of the server 42 then stores the transmitted server time TT into the time storage module 52 (step S27).

The transmitted TT response message is received by the communication module 32 of the client 43 over the network 11.

The communication module 32 of the client 43 transfers the TT response message containing the signature-bearing random number RC and server time TT as well as the random number RS to the message processing module 61. Upon receipt of the TT response message, the message processing module 61 of the client 43 transfers to the encryption processing module 34 the original random number RC stored inside as well as the signature-bearing random number RC and server time TT so that the encryption processing module 34 can authenticate the signature (step S28).

If the signature is found to be authentic, the message processing module 61 of the client 43 stores the server time TT contained in the TT response message into the TT storage module 33 (step S29).

The message processing module 61 of the client 43 then turns the random number RS and server time TT into composite information. The composite information made up of the random number RS and server time TT is transferred from the message processing module 61 to the encryption processing module 34 so that the latter can put a signature on the composite information (step S30).

The message processing module 61 of the client 43 generates a license acquisition request message (called the license request message hereunder) containing the signature-bearing random number RS and server time TT, and sends the generated license request message to the server 42 through the communication module 32 (step S31).

The transmitted license request message is received by the communication module 22 of the server 42 over the network 11.

The communication module 22 of the server 42 transfers the license request message containing the signature-bearing random number RS and server time TT to the message processing module 61.

Upon receipt of the license request message, the message response module 51 of the server 42 verifies that the server time TT contained in the message coincides with the server time TT stored in the time storage module 52 and that the server time TT included in the message falls within a predetermined difference relative to the current time of day (step S32). When the server time TT is verified in this manner, the validity of the server time TT contained in the license request message is ascertained.

If the server time TT in the license request message is found to be valid, then the message response module 51 of the server 42 transfers to the encryption processing module 23 the original random number RS stored inside as well as the signature-bearing random number RS and server time TT so that the encryption processing module 23 can authenticate the signature (step S33).

If the signature is found to be authentic, the message response module 51 of the server 42 generates a response message containing the license (called the license response message hereunder), and sends the generated license response message to the client 43 through the communication module 22 (step S34).

The transmitted license response message is received by the communication module 32 of the client 43 over the network 11.

The transmitted TT response message is also received by the communication module 32 of the client 43 over the network 11.

The communication module 32 of the client 43 hands the license response message containing the license over to the message processing module 61. On receiving the license response message, the message processing module 61 of the client 43 stores the license contained in the message into the license storage module 36 (step S35).

When the client 43 stores the license, the license purchasing procedure comes to an end. Every time a license is purchased, the above-described steps to update the server time TT are carried out by the second content reproduction system 40.

Described below with reference to FIG. 9 is a typical sequence of steps in which content is reproduced by the second content reproduction system 40.

The message processing module 61 issues a content reproduction message to the reproduction module 37. On receiving the content reproduction message, the reproduction module 37 reads the corresponding license from the license storage module 36 and evaluates the retrieved license (step S41). If the license is found to restrict the time period for content reproduction, the reproduction module 37 read the server time TT from the TT storage module 33 and recognizes the retrieved server time TT as the current time of day for license evaluation (step S42).

If the license under evaluation turns out to permit content reproduction, the reproduction module 37 reads the corresponding content from the content storage module 35 and reproduces the retrieved content. If the license is found partially or totally to suppress reproduction of the content, the reproduction module 37 controls its content reproduction process accordingly (step S43).

As described, when the second content reproduction system 40 reproduces the content whose reproduction period is restricted, the corresponding license is evaluated not on the basis of the internal clock of the client 43 but in reference to the time kept by the server 42 (i.e., server time TT). Thus the second content reproduction system 40 of this invention prevents content that is subject to reproduction period restrictions from being illegitimately reproduced by the client 43 illustratively falsifying its internally kept time data.

With the second content reproduction system 40 in use, the server time TT kept by the client 43 is updated every time a license is acquired. Even if there exist numerous clients, the server 42 is no more overloaded than before because each client updates the server time TT at the time of license acquisition which always requires the client in question to access the server 42.

The second content reproduction system 40 has one drawback. Content could be reproduced illegally from the time the corresponding license was last acquired from the server 42 until the present time.

That drawback can be circumvented by having the server time TT updated periodically regardless of the operation for license acquisition. Alternatively, at the time of license evaluation, the server time TT may be compared with the time on an unsecured (i.e., tamper-prone) clock inside the client 43, and the later of the two times compared may be used as a basis for evaluating the time period for content reproduction. As another alternative, while the tamper-resistant modules (message processing module 61, TT storage module 33, encryption processing module 34, and reproduction module 37) in the client 43 are being active, the time that has elapsed during activation of these modules may be added to the server time TT stored in the TT storage module 33.

As many apparently different embodiments of this invention may be made without departing from the spirit and scope thereof, it is to be understood that the invention is not limited to the specific embodiments thereof except as defined in the appended claims.

What is claimed is:

1. A communication system for permitting data communication between a server apparatus and a client apparatus over a network, the communication system comprising: said server apparatus including a time information management unit configured to continuously update and store time information specifying a current time of day, said server apparatus receiving a signature-bearing random number from the client apparatus and transmitting said time information specifying the current time of day along with the random number to said client apparatus; and said client apparatus including a time information storage unit configured to receive said time information specifying the current time of day and the signature-bearing random number from said server apparatus and store the received time information, said time information storage unit configured to prevent modification of said time information stored therein; and a content reproduction unit configured to reproduce content in response to a determination that the received time information specifying a current time of day is within a time period in which the content can be reproduced.

2. The communication system according to claim 1, wherein said client apparatus further comprises: a content storage unit configured to store said content including restriction information for restricting a time period in which said content can be reproduced, wherein the content reproduction unit is configured to reproduce said content stored in said content storage unit, and said content storage unit is configured to prevent modification of said content.

3. The communication system according to claim 2, wherein said restriction information is a license for said content.

4. The communication system according to claim 2, wherein said time information storage unit is configured to receive said time information from said server apparatus by requesting transmission of said time information from said server apparatus at content reproduction time.

5. The communication system according to claim 4, wherein, when said restriction information about the content to be reproduced restricts a time period in which said content can be reproduced, said time information storage unit receives said time information from said server apparatus by requesting transmission of said time information from said server apparatus.

6. The communication system according to claim 2, wherein, when a license for said content is to be acquired over said network, said time information storage unit receives said time information from said server apparatus by requesting transmission of said time information from said server apparatus.

7. The communication system according to claim 6, wherein, when said license for said content is to be acquired over said network, then said time information storage unit receives said time information from said server apparatus by requesting transmission of said time information from said server apparatus, said time information storage unit further receiving said time information from said server apparatus by periodically requesting transmission of said time information from said server apparatus.

8. The communication system according to claim 6, wherein said content reproduction unit compares the time information stored in said time information management unit with a second time information managed by a module which is not configured to prevent modification of the second time information, and restricts reproduction of said content on the basis of the comparison.

9. The communication system according to claim 6, wherein, when a module configured to prevent modification of a time is activated to manage said time, said time information storage unit adds elapsed time in said module to said time information stored in said time information management unit.

10. A server apparatus configured to communicate with client apparatuses on a network, said server apparatus comprising: a time information management unit configured to continuously update and store time information specifying a current time of day, receive a signature-bearing random number from a client apparatus, and transmit said time information along with the signature-bearing random number to the client apparatus over said network for receipt by the client apparatus, the time information being stored at the client apparatus, modification of the stored time information being prevented, and content being reproduced at the client apparatus in response to a determination that the time information specifying a current time of day is within a time period in which the content can be reproduced.

11. The server apparatus according to claim 10, wherein said time information management unit is configured to transmit said time information in response to a transmission request from a module of said client apparatus configured to prevent modification of said time information.

12. A client apparatus for communicating with a server apparatus over a network, said client apparatus comprising: a random number generator to generate a signature-bearing random number; a transmitter to transmit the signature-bearing random number to the server; a time information storage unit configured to receive time information and the signature-bearing random number from said server apparatus, said time information specifying a current time of day and being continuously updated and stored by said server apparatus, and to store the received time information, said time information storage unit configured to prevent modification of said time information stored therein; and a content reproduction unit configured to reproduce content in response to a determination that the received time information specifying a current time of day is within a time period in which the content can be reproduced.

13. The client apparatus according to claim 12, further comprising: a content storage unit configured to store said content including restriction information for restricting a time period in which said content can be reproduced, wherein the content reproduction unit is configured to reproduce said content stored in said content storage unit, and said content storage unit is configured to prevent modification of said content.

14. The client apparatus according to claim 13, wherein said restriction information is a license for said content.

15. A reproducing method for reproducing content, comprising the steps of: continuously updating and storing time information specifying a current time of day on a server apparatus; receiving a signature-bearing random number from a client apparatus at the server apparatus; transmitting over a network the time information specifying the current time of day and the signature-bearing random number from the server apparatus to the client apparatus; receiving the time information specifying the current time of day and the signature-bearing random number at the client apparatus from the server apparatus; storing the time information received by the client apparatus in a storage module configured to prevent modification of said time information; and reproducing said content in response to a determination that the received time information specifying the current time of day is within a time period in which the content can be reproduced.

16. The communication system according to claim 1, wherein the determination that the received time information specifying the current time of day is within the time period in which the content can be reproduced is made in response to a received content reproduction instruction.

* * * * *